United States Patent [19]

Nakatsuka et al.

[11] Patent Number: 5,144,419
[45] Date of Patent: Sep. 1, 1992

[54] METHOD OF AND APPARATUS FOR RECORDING COLOR IMAGE

[75] Inventors: Kimihiro Nakatsuka; Masafumi Tagaya, both of Kyoto, Japan

[73] Assignee: Dainippon Screen Mfg. Co., Ltd., Kyoto, Japan

[21] Appl. No.: 601,647

[22] Filed: Oct. 23, 1990

[30] Foreign Application Priority Data

Oct. 31, 1989 [JP] Japan .................. 1-285823

[51] Int. Cl.$^5$ .............................. H04N 1/46
[52] U.S. Cl. ......................... 358/75; 358/76; 358/80
[58] Field of Search .............. 358/75, 76, 78, 80

[56] References Cited

U.S. PATENT DOCUMENTS

| | | | |
|---|---|---|---|
| 4,573,071 | 2/1986 | Sakamoto | 358/76 |
| 4,639,770 | 1/1987 | Jung et al. | 358/76 |
| 4,705,745 | 11/1987 | Kitchin et al. | 430/505 |
| 4,926,254 | 5/1990 | Nakatsuka et al. | 358/76 |
| 4,975,769 | 12/1990 | Aizu | 358/80 |
| 4,992,862 | 2/1991 | Gabor | 358/76 |

OTHER PUBLICATIONS

Hashimoto et al., "Full Color Inspection System," *Japan Printer* 1987 (vol. 70), pp. 9-14.
"Electronic Color Separation", Dr. R. K. Molla, 1988, pp. 88 and 93.

*Primary Examiner*—Jose Couso
*Attorney, Agent, or Firm*—Lowe, Price, LeBlanc & Becker

[57] ABSTRACT

Density signals ($S_Y$, $S_M$, $S_C$, $S_K$) representing yellow, magenta, cyan and black densities on an original color image are inputted and are subject to color computations in a color computation circuit (202). The corrected density signals ($S_{Y1}$, $S_{M1}$, $S_{C1}$, $S_{K1}$) are converted into halftone dot singals ($S_{DY}$, $S_{DM}$, $S_{DC}$, $S_{DK}$), respectively. The halftone dot signal for black is combined with the other three halftone dot signals individually in combining circuits ($204_y$, $204_m$, $204_c$) and are employed for recording a color proof image on a color photosensitive film (PF).

20 Claims, 12 Drawing Sheets

FOR
NEGATIVE
PHOTOSENSITIVE
MATERIAL $= S_{ny} + S_{nk}$

FOR
POSITIVE
PHOTOSENSITIVE
MATERIAL $= S_{py} \cdot S_{pk}$

K-MONOCHROMATIC PATTERN

Y-MONOCHROMATIC PATTERN

METHOD OF AND APPARATUS FOR RECORDING COLOR IMAGE

BACKGROUND OF THE INVENTION

1. Field of the Invention

The present invention relates to a method of and an apparatus for recording a color image on a color photosensitive material such as a photographic color film on the basis of image signals representing a plurality of color-separated images which are obtained by color-separating a color original.

2. Description of Prior Arts

In order to print a color image, a proof print is generally produced before a final printing step, to confirm the quality of the image to be printed. To this end, respective color-separated halftone image films for yellow (Y), magenta (M), cyan (C) and black (K) blocks are generally employed for successively printing the color-separated halftone images on a color photograhic proof paper to obtain a proof image thereon (this method is hereinafter referred to as "simple proof method").

However, when a defect is found in color separation conditions, for example, as the result of the simple proof method, it is necessary to carry out two steps of color separation and the simple proof again, while the color separation film produced through a number of steps at a cost is abandoned noneconomically.

Although an image for proof can be simply produced with no printing step by employing a color photosensitive film, for example, it is necessary to print respective color separation images onto a color film in registration with the greatest possible care. Further, the color photosensitive film has only color photosensitive layers for yellow, magenta and cyan, and hence it is necessary to color all of the three color layers in correspondence to a black separated halftone image, in order to simulate the printing effect of the black separated halftone image. Thus, it is necessary to expose the color photosensitive film through Y, M and C color-separated image films in time series while overlaying each of the Y, M and C color-separated image films with a K color separated image film. The overlaying operation requires accurate positional adjustment between the Y (M or C) color-separated image film and the K color-separated image film. Therefore, the operation for the exposure is laborious. Furthermore, the recorded halftone dots are often blurred due to the thickness of overlaid films.

SUMMARY OF THE INVENTION

The present invention is directed to a method of recording a color image on a color photosensitive material.

According to the present invention, the method comprises the steps of: (a) obtaining first to fourth image signals which respectively represent density levels of yellow, magenta, cyan and black components of a color original image for each pixel; (b) converting the first to fourth image signals into first to fourth halftone dot signals, respectively; (c) Obtaining first to third composite halftone dot signals by: (c-1) combining the first halftone dot signal with the fourth halftone dot signal through a first logical operation to obtain the first composite halftone dot signal; (c-2) combining the second halftone dot signal with the fourth halftone dot signal through a second logical operation to obtain the second composite halftone dot signal; and (c-3) combining the third halftone dot signal with the fourth halftone dot signal through a third logical operation to obtain the third composite halftone dot signal; and (d) modulating exposure beams with the first to third composite halftone dot signals while scanning a color photosensitive material with said exposure beams, to thereby obtain a color image on the color photosensitive material.

Preferably, the step (b) comprises the steps of: (b-1) correcting the first to fourth image signals according to predetermined correction rules to obtain first to fourth corrected image signals, respectively; and (b-2) converting the first to fourth corrected image signals into the first to fourth halftone dot signals, respectively.

The correction rules are so determined that a difference between respective color densities on printed images on printing medium and recorded images on color photosensitive medium can be compensated for.

The present invention also provides an apparatus adapted for conducting the present method.

According to the present invention, since the black halftone dot of the original color image is reproduced in a color image recorded on a color photosensitive material together with the yellow, magenta and cyan halftone dots, a printed image can be simulated on the recorded image with color tones faithful to those in the printed image. When color computations are applied to color component signals before combining chromatic color components with an achromatic color component, the color tones on the recorded image becomes more faithful to those on the recorded image.

Accordingly, a object of the present invention is to provide a method of and an apparatus for recording a color image on a color photosensitive material in color tones faithful to those on printed color images.

Another object of the present invention is to obtain a color proof image of high quality by directly recording the same on a color photosensitive material.

These and other objects, features, aspects and advantages of the present invention will become more apparent from the following detailed description of the present invention when taken in conjunction with the accompanying drawings.

DESCRIPTION OF REFERRED EMBODIMENTS

A. Principle

When a color photosensitive material such as a color film on which silver chloride layers are formed is exposed to lights of blue (B), green (G) and red (R), the complementary colors thereof, i.e., yellow (Y), magenta (M) and cyan (C), appears on the color film as latent images.

On the other hand, color printing is generally performed through four-color overprinting utilizing an ink of black (K) in addition to inks of yellow, magenta and cyan. Therefore, a color process scanner reads a color original and obtains color separated image signals for the four colors.

In general, a portion of a color photosensitive material where all of the three colors of Y, M and C overlap each other appears black. In order to directly record a color image on a color photosensitive material on the basis of color separated image signals for the four colors, therefore, halftone dots of black may be composed by halftone dots of the three colors of yellow, magenta and cyan. Namely, if respective ones of color separated image signals for Y, M and 0 printers are composed with a color separated image signal for the K printer and a color photosensitive material is exposed on the basis of the composed color separated image signals for the Y, M and C printers, it is possible to produce a color image which is equivalent to that formed by overprinting color separated halftone images of the four colors.

FIGS. 2A to 2D are explanatory diagrams for illustrating a method of composing halftone images for a Y printer and a K printer according to the aforementioned principle.

Figure 2A:
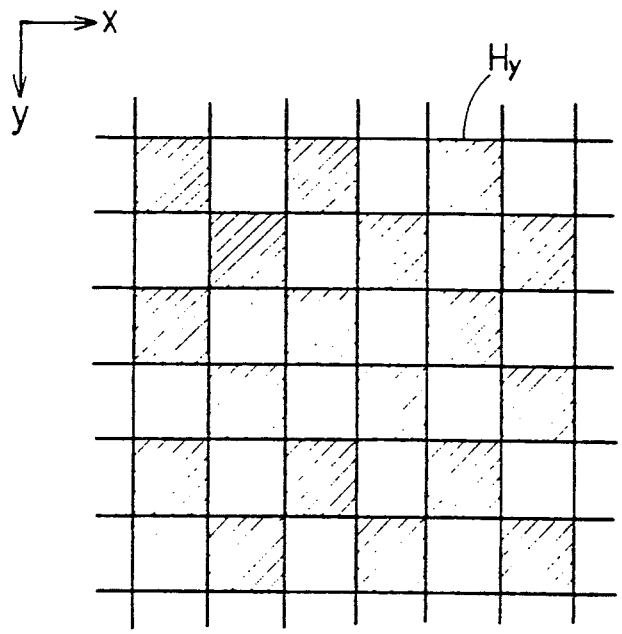
FIGS. 2A to 2D are explanatory diagrams each showing a method of combining two halftone images.
Figure 2B:
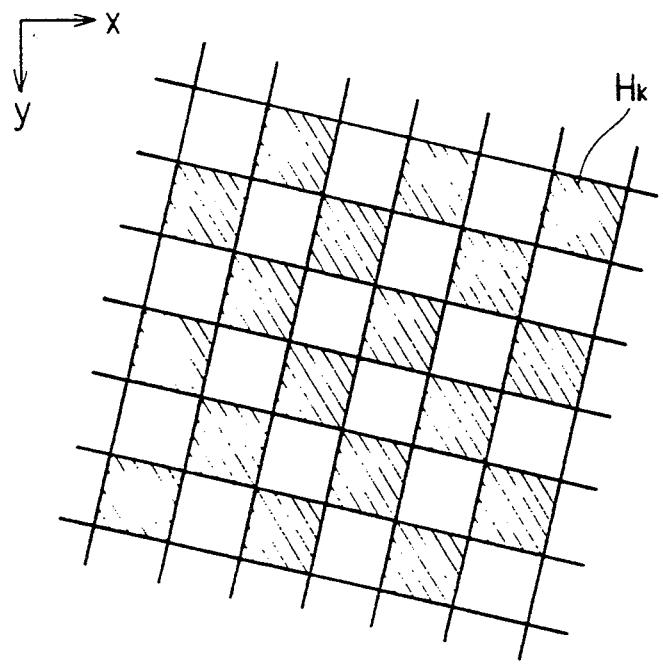

FIGS. 2A and 2B illustrate halftone images of the Y printer and the K printer respectively, for showing regions to be formed as yellow halftone dots $H_y$ (hereinafter referred to as "Y halftone dots") and black halftone dots $H_k$ (hereinafter referred to as "K halftone dots") with oblique lines respectively. FIGS. 2A and 2B correspond to the case of a halftone area rate of 50%, while this is for facilitating understanding of the present invention and actual halftones may be in large and small sizes in correspondence to to the image. In tour color printing, different screen angles are generally employed in respective halftone images of Y, M, C and K printers. At this time, halftone dots of the respective halftone images are arranged to form lattices mutually inclined respectively, as shown in FIGS. 2A and 2B.

Figure 2C:
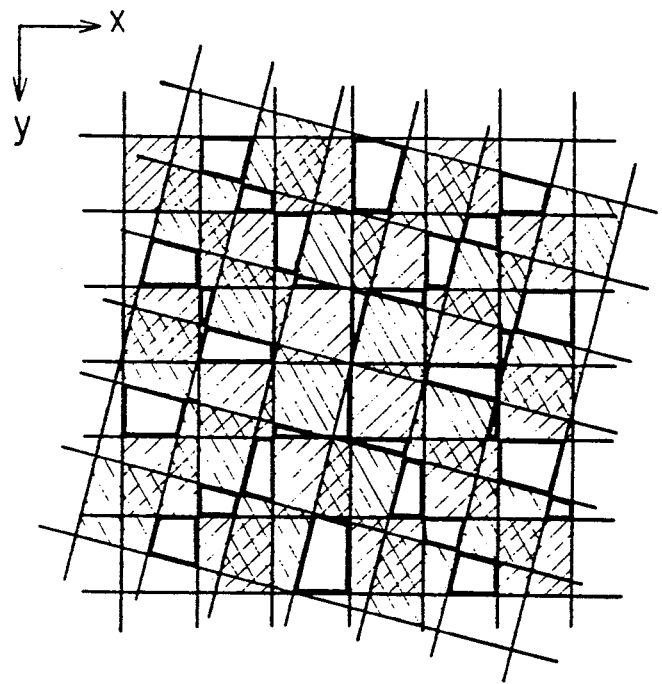
Figure 2D:
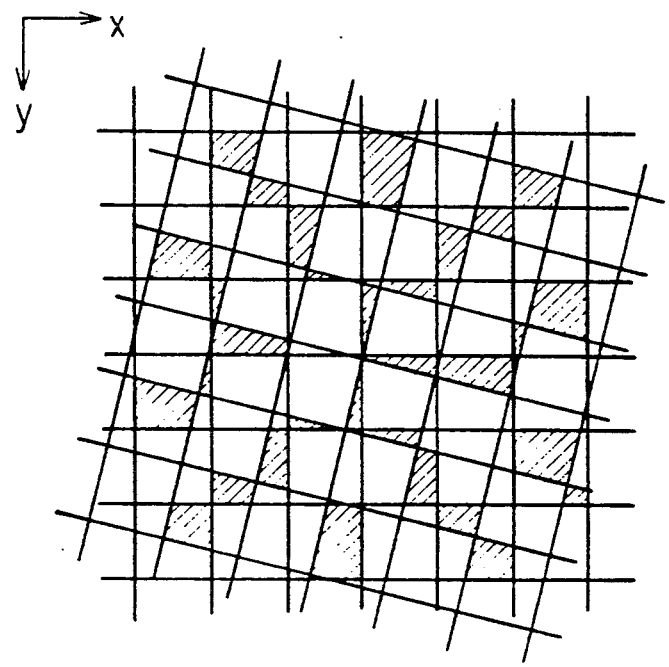

FIG. 2C is drawn by overlapping FIGS. 2A and 2B. Referring to FIG. 2C, regions with oblique lines correspond to a union or a logical sum of halftone dots in the halftone images for the Y and K printers. i.e., regions where a color layer of yellow must color on a color photosensitive material. If the color photosensitive material is a negative photosensitive material (a photosensitive material whose exposed portions color), the oblique regions in FIG. 2C are exposed with blue light. If the color photosensitive material is a positive photosensitive material (a photosensitive material whose unexposed portions color), non-oblique regions in FIG. 2C are exposed with blue light. FIG. 2D shows regions to be exposed in employment of the positive photosensitive material with oblique lines, which are a logical sum of the halftone dots for Y and K components in negative logic. Thus, positive images, i.e., "positives", can be obtained in both cases of negative and positive photosensitive materials.

Regions where color layers of magenta and cyan must color may be similarly obtained by calculating a logical sum of regions of magenta halftone dots (hereinafter referred to as "M halftone dots") and K halftone dots, and a logical sum of regions of cyan halftone dots (hereinafter referred to as "C halftone dots") and K halftone dots.

Thus, when all of the three colors of Y, M and C are made to color on same regions, the regions become black to substantially provide K halftone dots therein, whereby it is possible to record halftone dots of the four colors on the color photosensitive material.

Figure 3A:
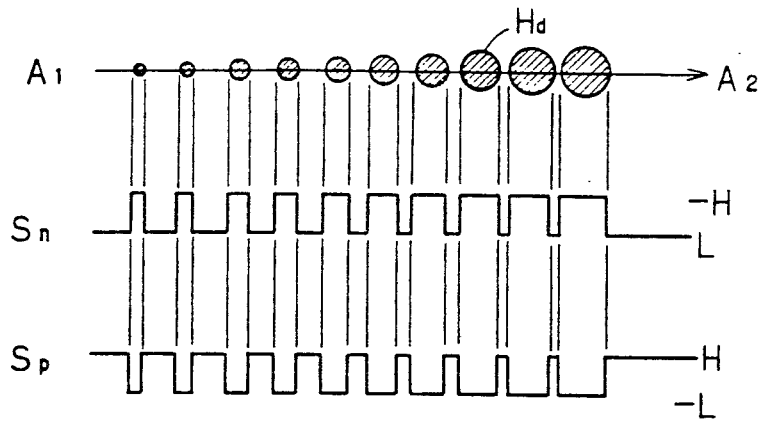
FIGS. 3A to 3C are explanatory diagrams showing a method of combining halftone dot signals.

FIGS. 3A. to 3C are explanatory diagrams showing difference in methods of composing halftone dot signals in cases of employing a positive photosensitive material and a negative photosensitive material.

FIG. 3A shows a relation between sizes of halftone dots and halftone dot signals. It is assumed that a photosensitive material is exposed in a direction $A_1$-$A_2$, and a halftone dot signal $S_n$ for a negative photosensitive material and a halftone dot signal $S_p$ for a positive photosensitive material along the line $A_1$-$A_2$ are illustrated. The halftone dot signals $S_n$ and $S_p$ are signals for ON/OFF controlling exposure beams, and the photosensitive material is exposed when these signals are at high levels. Since exposed regions color in the negative photosensitive material, the halftone dot signal $S_n$ is so produced that it is high in a portion of a halftone dot $H_d$ while it is low in portions which are not the halftone dot $H_d$, in order to form the halftone dot $H_d$ as shown in FIG. 3A. The halftone dot signal $S_p$ for the positive photosensitive material is obtained by inverting the halftone dot signal $S_n$ for the negative photosensitive material.

Figure 3B:
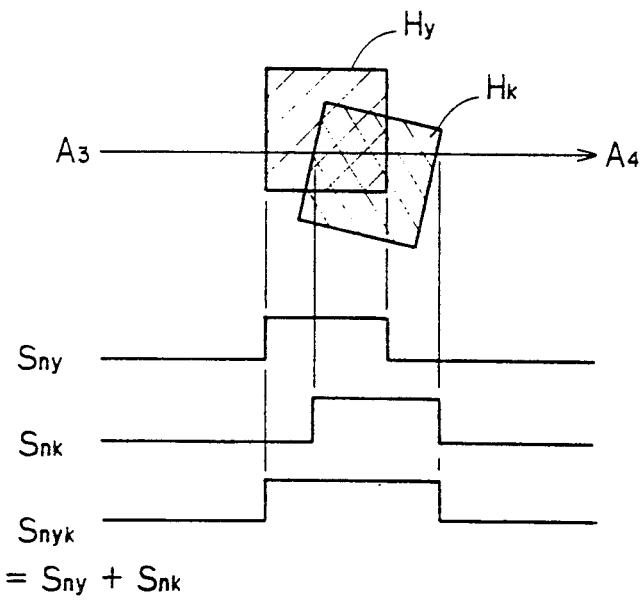

FIG. 3B shows a method of combining a halftone dot signal $S_{ny}$ for a Y halftone dot and a halftone dot signal $S_{nk}$ for a K halftone dot in the case of employing the negative photosensitive material. A portion where a Y halftone dot $H_y$ and a K halftone dot $H_k$ partially overlap with each other in a direction $A_3$-$A_4$. At this time, a composite halftone dot signal $S_{nyk}$ is produced by calculating a logical sum of the two halftone dot signals $S_{ny}$ and $S_{nk}$.

Figure 3C:
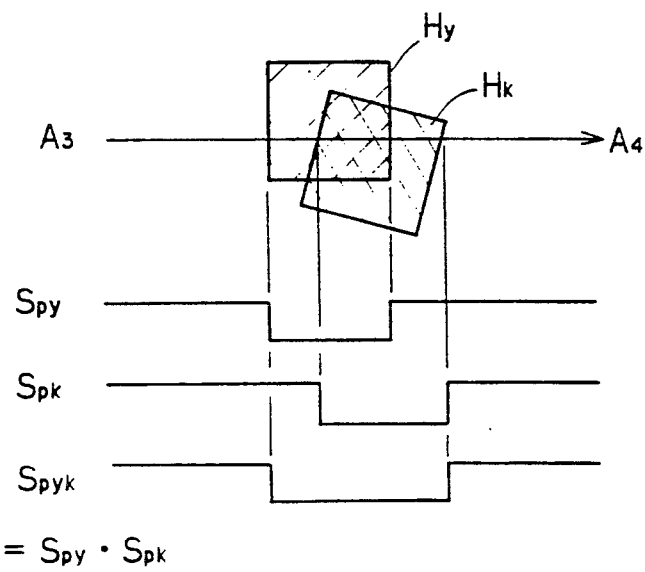

FIG. 3C shows a method of combining a halftone dot signal $S_{py}$ for a Y halftone dot and a halftone dot signal $S_{pk}$ for a K halftone dot in the case of employing the positive photosensitive material. When the positive photosensitive material is used, a composite halftone dot signal $S_{pyk}$ is produced by calculating a logical product of the two halftone dot signals $S_{py}$ and $S_{pk}$.

When the composite halftone dot signal $S_{nyk}$ or $S_{pyk}$ thus produced is used to expose a negative photosensitive material or a positive photosensitive material, it is possible to record a positive color image in either case.

B. Structure and Operation of Apparatus

Figure 1A:
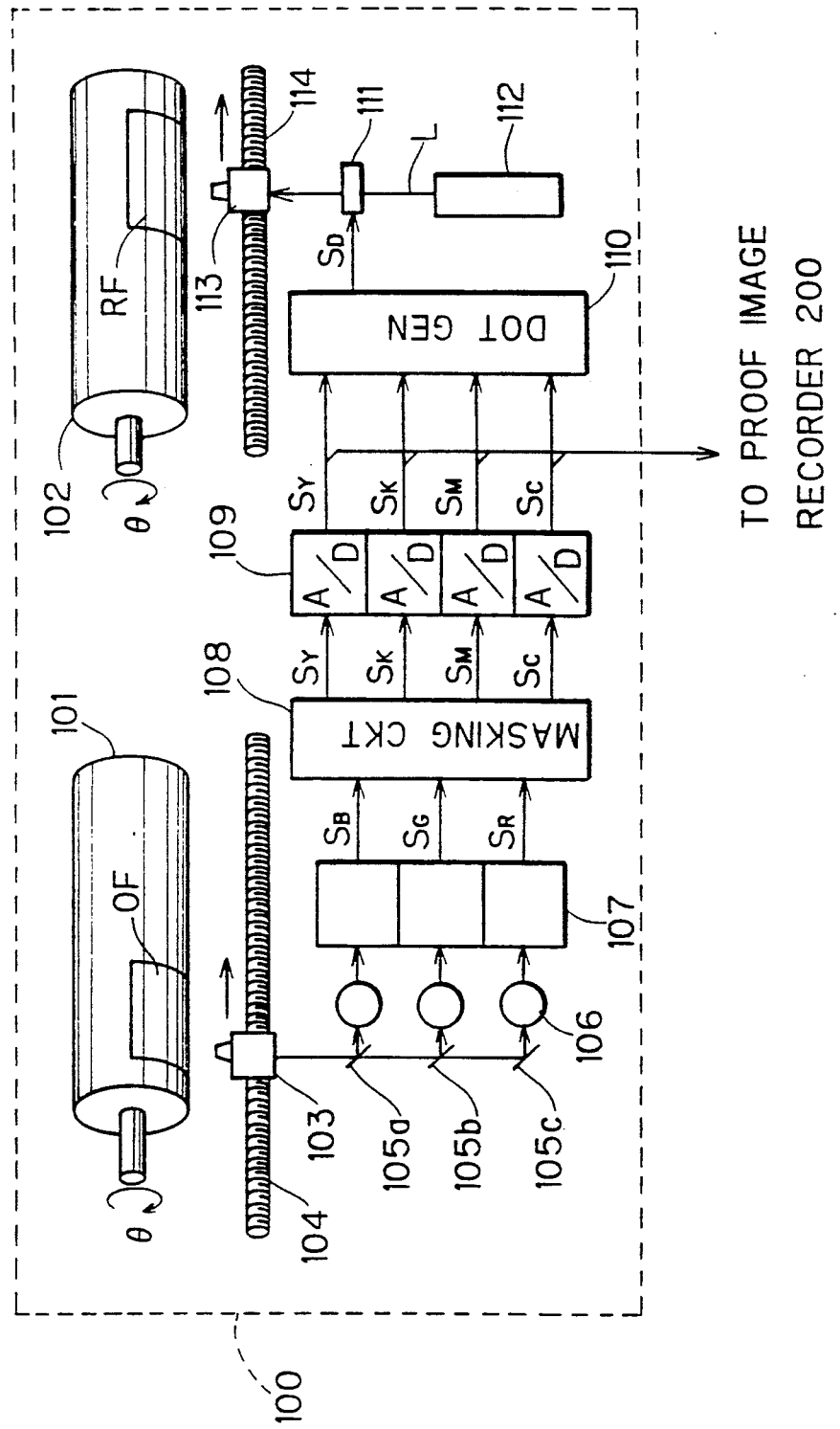
FIGS. 1A through 1C are schematic block diagrams showing an apparatus according to a preferred embodiment of the present invention.
Figure 1B:
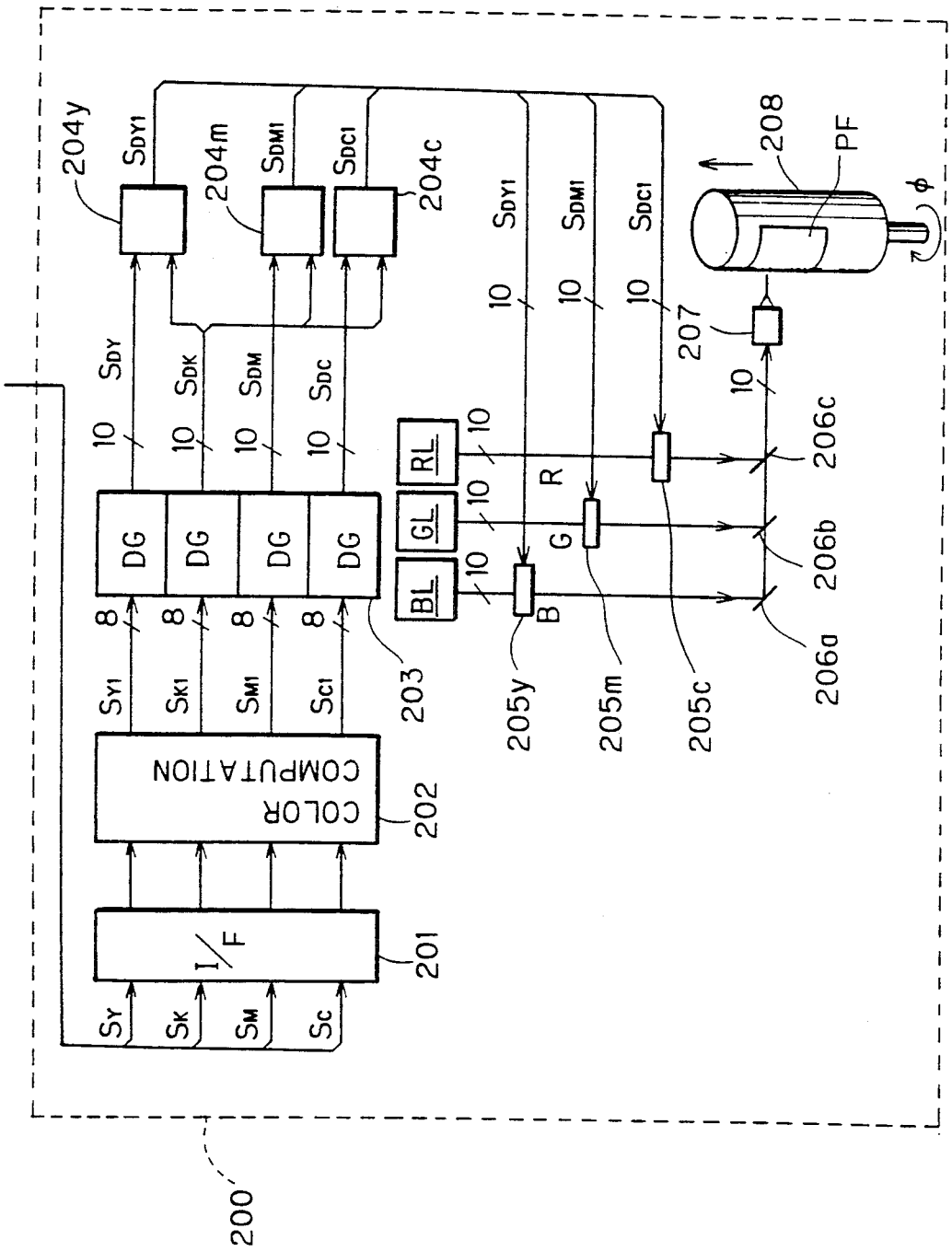

FIG. 1A as combined with FIG. 1B illustrates the structure of a scanner system according to a preferred embodiment of the present invention. This scanner system is formed by a color scanner and a proof image recorder 200.

The color scanner 100 comprises an input drum 101 and an output drum 102, so that a color original film OF is wound on the input drum 101 and a recording photosensitive film RF for recording halftone images obtained by color separation is wound on the output drum 102 respectively.

In order to scan and read the original OF, the input drum 101 rotates in a direction $\theta$ at a constant rate, while a scan head 103 is driven by a feed screw 104 in a direction parallel to the rotation axis of the drum 101 at a constant rate. Light outgoing from a light source (not shown) which is provided in the input drum 101 passes through the transparent input drum 101 and the color original OF, and is thereafter received by the scan head 103. Components of blue (B), green (G) and red (R) of the light inputted by the scan head 103 are reflected by three dichroic mirrors 105a to 105c respectively. The reflected three light components are converted into electrical signals by photomultiplier tubes 106, and thereafter converted into blue, green and red density signals $S_B$, $S_G$ and $S_R$ by amplifiers 107a to 107c respectively. These density signals $S_B$, $S_G$ and $S_R$ are supplied to a masking circuit 108, and subjected to processing such as color correction and gradation conversion, and converted into image signals $S_Y$, $S_K$, $S_M$ and $S_C$ which express color separated images for Y, K, M and C printers respectively. The image signals $S_Y$, $S_K$, $S_M$ and $S_C$ are converted into digital signals by A D converters 109, and supplied to a dot generator 110. The digital image signals $S_Y$, $S_K$, $S_M$ and $S_C$ are gradation level signals expressing 256 gradations in eight bits, for example.

In order to record halftone images for respective printers of Y, K, M and C on the recording film RF, the dot generator 110 generates a halftone dot signal $S_D$ by converting the image signals $S_Y$, $S_K$, $S_M$ and $S_C$ into respective halftone dot signals and applying parallel/serial conversion thereto. This halftone dot signal $S_D$ modulates an AOM (acousto optic modulator) and ON/OFF controls laser light L which is emitted from a laser source 112. The laser light L passing through the AOM 111 is focused by a recording head 113, and exposes the recording film RF which is wound on the output drum 102. Consequently, halftone images of the respective printers of Y, K, M and C are recorded on the recording film RF. In such recording operation, the output drum 102 rotates in the direction $\theta$ at a constant rate, and the recording head 113 is driven by a feed screw 114 in a direction parallel to the rotation axis of the output drum 102 also at a constant rate.

In order to produce a proof image, the color scanner 100 supplies the digital image signals $S_Y$, $S_K$, $S_M$ and $S_C$ to the proof image recorder 200 shown in FIG. 1B.

The proof image recorder 200 comprises an interface circuit 201, a color computation circuit 202, dot generators 203, signal combining circuits $204_y$, $204_m$ and $204_c$, laser sources BL, GL and RL for emitting blue laser light, green laser light and red laser light respectively, AOM units $205_y$, $205_m$ and $205_c$ for ON/OFF controlling the repective color laser light components, dichroic mirrors $206_a$, $206_b$ and $206_c$, an exposure lens 207, and a drum 208 on which a color photosensitive film PF is wound. In these elements, the color computation circuit 202 serves as color computation means. Further, the dot generator 203 serves as halftone dot signal generation means and the signal combining circuits $204_y$, $204_m$ and $204_c$ serve as signal combining means, while the AOM units $205_y$, $205_m$ and $205_c$, the dichroic mirrors $206_a$ to $206_c$, the exposure lens 207 and the drum 208 etc serve as recording means.

In the proof image recorder 200, the digital image signals $S_Y$, $S_K$, $S_M$ and $S_C$ are supplied to the color computation circuit 202 through the interface circuit 201. This color computation circuit 202 has a function of correcting the respective digital image signals $S_Y$, $S_K$, $S_M$ and $S_C$ so that the color tone of the proof image coincides with the color tone of an image on a printing paper. The content of the processing by the color computation circuit 202 is described in detail later.

Image signals $S_{Y1}$, $S_{K1}$, $S_{M1}$ and $S_{C1}$ corrected by the color computation circuit 202 are inputted in the dot generators 203 for four channels in parallel, and converted into halftone dot signals $S_{DY}$, $S_{DK}$, $S_{DM}$ and $S_{DC}$. These halftone dot signals $S_{DY}$, $S_{DK}$, $S_{DM}$ and $S_{DC}$ are similar to the halftone dot signals $S_{ny}$ and $S_{nk}$ for a negative photosensitive material shown in FIG. 3B, or the halftone dot signals $S_{py}$ and $S_{pk}$ for a positive photosensitive material shown in FIG. 3C. Namely, the respective halftone dot signals $S_{DY}$, $S_{DK}$, $S_{DM}$ and $S_{DC}$ express halftone dots in halftone images for the respective printers of Y, K, M and C, and signal levels thereof in pixel positions having halftone dots are different from those in positions having no halftone dots on respective scanning lines. According to this embodiment, the color photosensitive film PF is exposed by simultaneously using ten exposure beams as hereinafter described, and hence each of the halftone dot signals $S_{DY}$, $S_{DK}$, $S_{DM}$ and $S_{DC}$ is formed as a 10-bit signal for controlling the ten exposure beams.

Screen line numbers or pitches and screen angles of the halftone images for the respective printers of Y, K, M and C are set at required values in the dot generators 203 respectively. A method of arbitrarily setting screen line numbers and screen angles of halftone images is known in the art and disclosed in detail in Japanese Patent Laying Open Gazette No. 55-6393/1980, Japanese Patent Laying-Open Gazette No. 61-137173/1986 and the like, for example.

The halftone dot signals $S_{DY}$, $S_{DM}$ and $S_{DC}$ for the respective printers of Y, M and C are inputted in the signal combining circuits $204_y$, $204_m$ and $204_c$ with the halftone dot signal $S_{DK}$ for the K printer. The signal combining circuits $204_y$, $204_m$ and $204_c$ perform signal combining processing shown in FIG. 3B or 3C.

Figure 1C:
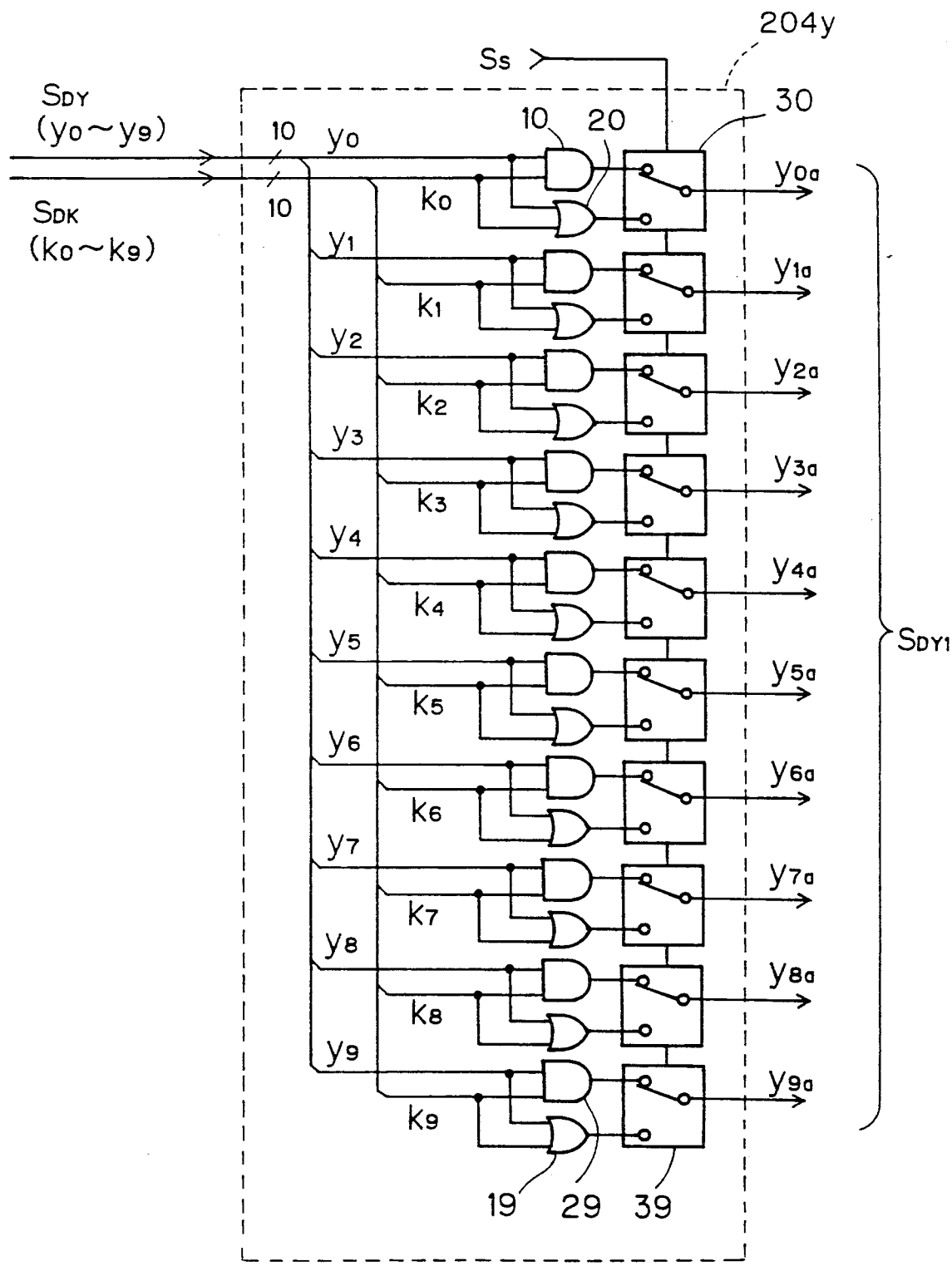

FIG. 1C is a block diagram showing the internal structure of the signal combining circuit $204_y$ for Y halftone dots. As hereinabove described, the halftone dot signals $S_{DY}$ and $S_{DK}$ are 10-bit signals corresponding to the ten exposure beams. Signals $y_0$ to $y_9$ of respective bits of the halftone dot signal $S_{DY}$ are inputted in AND gates 10 to 19 and OR gates 20 to 29 respectively. Signals $k_0$ to $k_9$ of respective bits of the halftone dot signal $S_{DK}$ are also inputted in the AND gates 10 to 19 and the OR gates 20 to 29 respectively. The AND gates 10 to 19 calculate respective logical products of the ten pairs of signals $(y_0, k_0)$ to $(y_9, k_9)$. The OR gates 20 to 29 calculate respective logical sums of the ten pairs of signals $(y_0, k_0)$ to $(y_9, k_9)$. Namely, the AND gates 10 to 19 carry out the combining processing of the halftone dot signals for a positive photosensitive material shown in FIG. 3C, and the OR gates 20 to 29 carry out the combining processing of the halftone dot signals for a negative photosensitive material shown in FIG. 3B. Outputs of the AND gates 10 to 19 are supplied to switch circuits 30 to 39 respectively, while outputs of the OR gates 20 to 29 are also supplied to the switch circuits 30 to 39 respectively. The switch circuits 30 to 39 are switched in response to an externally supplied switching signal $S_s$ for designating one of "negative" and "positive" in accordance with the type of the color film PF, and output the output signals from the AND gates 10 to 19 or the output signals from the OR gates 20 to 29. More particularly, the switching signal $S_s$ switches the switch circuits 30 to 39 to output the output signals from the AND gates 10 to 19 when the color film PF is a positive photosensitive material, while outputting the output signals from the OR gates 20 to 29 when the same is a negative photosensitive material. 10-bit signals $y_{0a}$ to $y_{9a}$ thus outputted define a composite halftone dot signal $S_{DY1}$ for controlling ten blue exposure beams.

The signal combining circuits $204_m$ and $204_c$ for the M and C halftone dots are identical in structure to the circuit shown in FIG. 1C.

The composite halftone dot signals $S_{DY1}$, $S_{DM1}$ and $S_{DC1}$ generated by the signal combining circuits $204_y$, $204_m$ and $204_c$ are supplied to the AOM units $205_y$, $205_m$ and $205_c$ respectively. Each of the AOM units $205_y$, $205_m$ and $205_c$ is formed by a 10-channel AOM, for ON/OFF controlling the ten exposure beams. Further, the AOM units $205_y$, $205_m$ and $205_c$ control exposure beams B, G and R of blue, green and red respectively. The exposure beams B, G and R modulated by the AOM units $205_y$, $205_m$ and $205_c$ are combined into ten beams by the dichroic mirrors $206a$ to $206c$, and focused by the exposure lens 207 to expose the color photosensitive film PF which is wound on the drum 208, so that the proof image is recorded on the color photosensitive material as a latent image. In such exposure, the drum 208 rotates in a direction $\phi$ at a constant rate, while moving in a direction which is parallel to its rotation axis at a constant rate.

Thus, the proof image is obtained in accordance with the halftone dots for the respective printers of Y, M, C and K on the basis of the composite halftone dot signals $S_{DY1}$, $S_{DM1}$ and $S_{DC1}$. Thus, not only the color tone but also line interruption and presence/absence of moires can be advantageously confirmed by observing a visible color proof image which is obtained by developing the latent image on the color film PF.

C. Internal Structure and Content of Processing of Color Computation Circuit 202

Figure 4A:
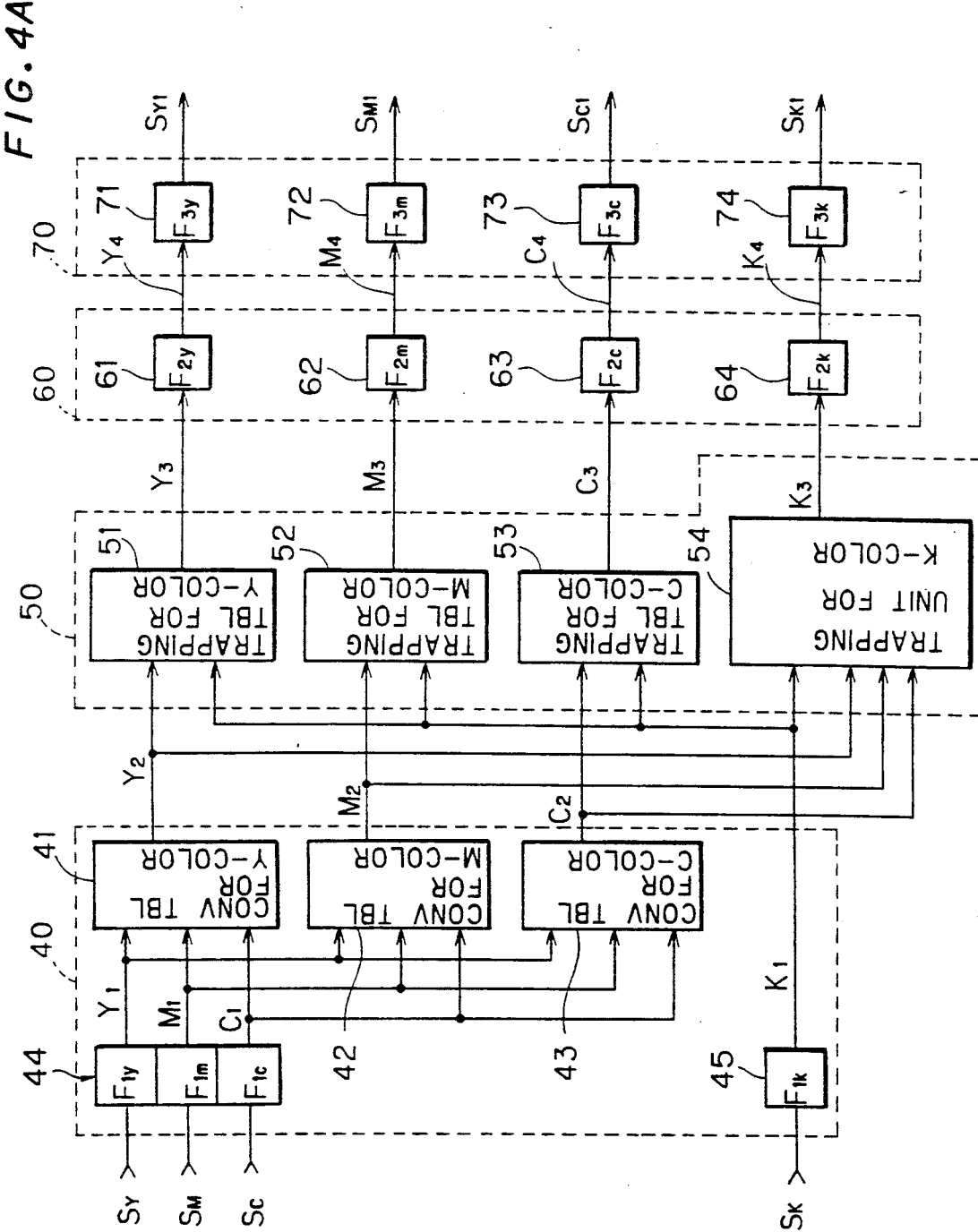
FIGS. 4A and 4B are block diagrams showing the internal structure of a color computation circuit.

FIG. 4A is a block diagram showing the internal structure of the color computation circuit 202. The color computation circuit 202 is formed by a first processing unit 40, a second processing unit 50, a third processing unit 60 and a fourth processing unit 70. The first processing unit 40 converts the image signals $S_Y$, $S_M$, $S_C$ and $S_K$ expressing gradation levels into signals expressing monochromatic density levels of Y, M, C and K, while compensating for a first additive failure (described later) between the respective colors of Y, M and C and the coloring property of the color photosensitive material in the film PF. The second processing unit 50 compensates for a second additive failure between black (K) and the respective colors of Y, M and C. The third processing unit 60 corrects gradations of the respective colors of Y, M, C and K, and adjusts gray balances thereof. The fourth processing unit 70 converts the signals for Y, M, C and K expressing the monochromatic density levels into signals expressing gradation levels. Details of the respective processing units are as follows:

The digital image signals $S_Y$, $S_M$, $S_C$ and $S_K$ inputted in the first processing unit 40 are first converted into density signals $Y_1$, $M_1$, $C_1$ and $K_1$ expressing monochromatic density levels of Y, M, C and K by first conversion functions $F_{1y}$, $F_{1m}$, $F_{1c}$ and $F_{1k}$ respectively. As described above, the digital image signals $S_Y$, $S_M$, $S_C$ and $S_K$ are gradation level signals expressing 256 gradations in eight bits respectively. The gradation levels are substantially proportionate to halftone area rates, while a certain relation holds between halftone area rates on a printed matter and the monochromatic density values. The first conversion functions $F_{1y}$, $F_{1m}$, $F_{1c}$ and $F_{1k}$ are previously so determined as to represent such relation between the gradation levels or the halftone area rates and the monochromatic density levels for respective colors Y, M, C and K. The conversion functions $F_{1y}$, $F_{1m}$, $F_{1c}$ and $F_{1k}$ are set in converters 44 and 45 shown in FIG. 4A to convert the image signals $S_Y$, $S_M$, $S_C$ and $S_K$ into the density signals $Y_1$, $M_1$, $C_1$ and $K_1$.

The respective ones of the density signals $Y_1$, $M_1$ and $C_1$ for three chromatic colors are supplied to color conversion table memories 41, 42 and 43 in the first processing unit 40 respectively. The color conversion table memories 41 to 43 correct the density signals $Y_1$, $M_1$ and $C_1$ so that the color tone on a printing paper printed with inks of the three colors Y, M and C coincides with the color tone of the proof image corresponding thereto. Such color conversion tables in the memories 41 to 43 are produced by comparing the color tone on an actually produced printed paper with that of the proof image. Namely, halftone films of the respective printers of Y, M and C are first produced in the color scanner 100 on the basis of the image signals $S_Y$, $S_M$ and $S_C$ of the chromatic colors. Then, respective printers of Y, M and C are produced by using these halftone films, to produce a printed image by using the printers. On the other hand, a proof image is produced in the proof image recorder 200 on the basis of the same image signals $S_Y$, $S_M$ $S_K$ as above. The color conversion table memories 41 to 43 and the second processing unit are controlled to perform substantially no processing at this time. The color tone of the three-color printed image thus produced is compared with that of the proof image. It is assumed here that the image signals $S_Y$, $S_M$ and $S_C$ and the density signals $Y_1$, $M_1$ and $C_1$ correspond to density values y1, m1 and c1 on the printed image. It is further assumed that a color tone expressed by combination of y1, m1 and o1 on the printed image coincides with a color tone expressed by combination of density values y2, m2 and c2 corresponding to other density signals $Y_2$, $M_2$ and $C_2$ on the proof image. In this case, the color conversion tables in the memories 41 to 43 are so determined as to output the density signals $Y_2$, $M_2$ and $C_2$ expressing the density values y2, m2 and c2 in response to the combination of the density signals $Y_1$, $M_1$ and $C_1$ expressing the density values y1, m1 and c1.

The color conversion tables in the memories 41 to 43 having the aforementioned functions compensate for the first additive failure between the respective chromatic colors of Y, M and C, as well as compensate for the nonlinearity in the coloring property of the color photosensitive material. The term "additive failure" indicates such a phenomenon that the density of a printed image overlappingly printed with a plurality of colors of inks becomes lower than the sum of density values of the respective colors.

The color conversion tables in the memories 41 to 43 may be prepared according to the method described in Japanese Patent Laying-Open Gazette No. 64-80192 (1989).

The second processing unit 50 has trapping table memories 51 to 53 for the respective printers of Y, M and C, and a trapping unit 54 for the K printer. These elements 51 to 54 are adapted to compensate for the second additive failure between the respective chromatic colors of Y, M and C and K (black).

Figure 5B:
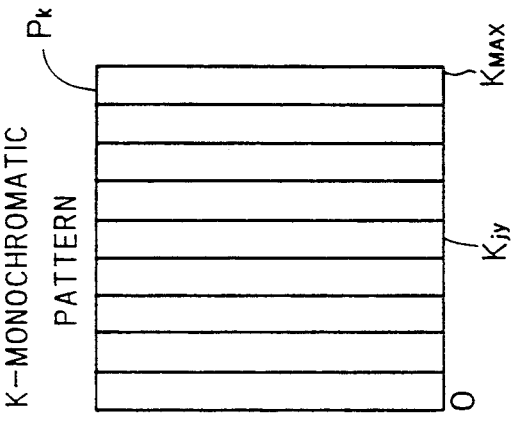
FIGS. 5A through 5C are explanatory diagrams showing a method of examining an additive failure property.
Figure 5A:
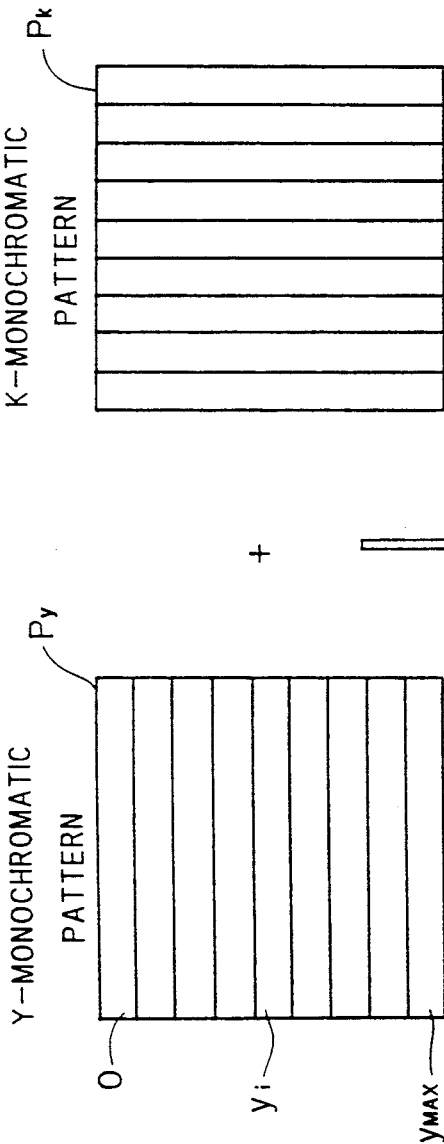
Figure 5C:
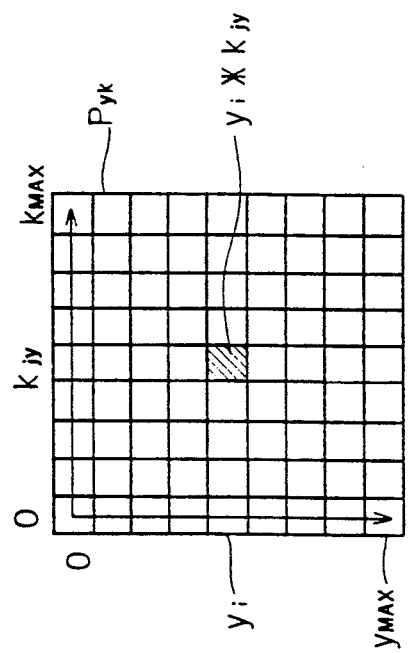
Figure 6:
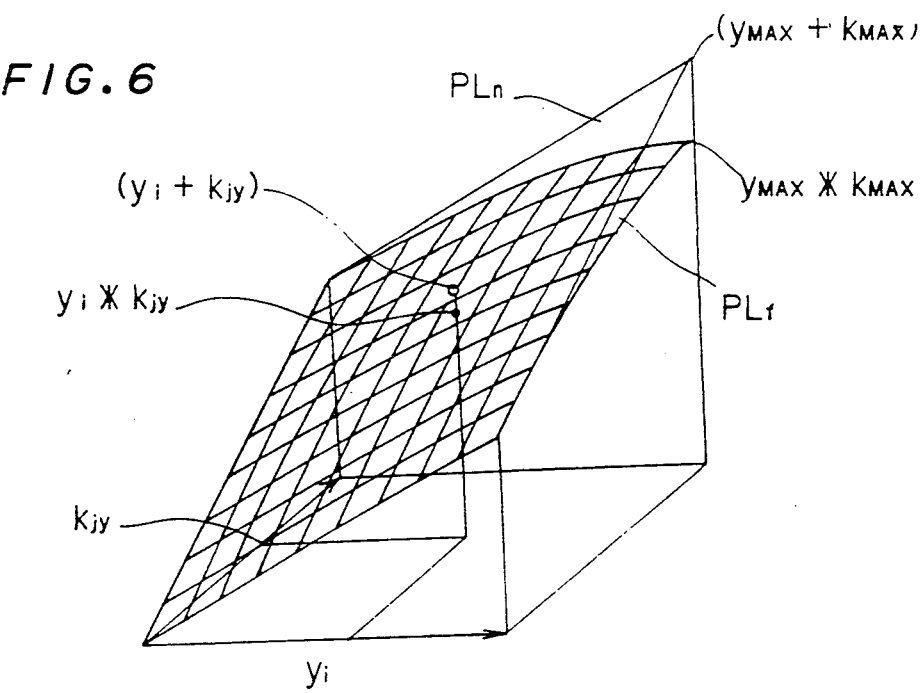
FIG. 6 is a three-dimensional graph showing the additive failure property.

The following description is made on an additive failure and a compensation method thereof in the case of overlappingly printing halftone images for Y and K printers. FIGS. 5A-5C illustrate a method of producing a printed matter for examining the additive failure. First, samples $P_y$ and $P_k$ in which strip-shaped regions having respective uniform halftone area rates are arranged in parallel are produced as samples of monochromatic printed images of Y and K colors, as shown in FIGS. 5A and 5B, in which the symbol $y_i$ denotes monochromatic density of a Y component in a region having a halftone area rate of i% on the sample $P_y$, and the symbol $k_{jy}$ denotes monochromatic density of a Y component in a region having a halftone area rate of j% on the sample $P_k$. The term "density" herein used indicates a value obtained by subtracting the background density of a printing paper from actually measured density. This also applies to the following description. Then, the same printers as those used for printing the monochromatic patterns $P_y$ and $P_k$ are used to produce a sample $P_{yk}$, which is an overprinted image of Y and K colors, as shown at FIG. 5C. Assuming that the symbol $y_i{}^*k_{jy}$ represents monochromatic density of the Y component obtained by actually measuring a patch in this sample $P_{yk}$ which is designated by the density values $y_i$ and $k_{jy}$, the value of this monochromatic density $y_i{}^*k_{jy}$ becomes lower than a value $(y_i+k_{jy})$ of density obtained by simply adding up the density values $y_i$ and $k_{jy}$. Namely, an additive failure takes place. FIG. 6 is a three-dimensional graph showing this additive failure. A curved surface (hereinafter referred to as "additive failure surface") $PL_f$ expressing the additive failure is drawn as a curved surface in a coordinate space having the Y component density $y_i$ of the sample $P_y$ and the Y component density $k_{jy}$ of the sample $P_k$ as two coordinate axes on the horizontal plane, and the added density $y_i{}^*k_{jy}$ as the coordinate axis in the vertical direction. FIG. 6 also shows a plane (hereinafter referred to as "simple addition plane") $PL_n$ expressing simply added density $(y_i+k_{jy})$. As shown in FIG. 6, the additive failure plane $PL_f$ is slightly lower than the simple addition plane $PL_n$, and the distance between these two planes increases as the simply added density $(y_i+k_{jy})$ increases.

The ratio $R_y$ of the Y component density on the additive failure surface to that on the simple addition density, which is hereinafter referred to as "density satisfaction rate", is obtained by the following equation (1), and therefore, the value $(1-R_y)$ represents a density reduction rate due to the additive failure.

$$R_y = (y_i{}^*k_{jy})/(y_i+k_{jy}) \qquad (1)$$

The additive failure is a phenomenon caused by overprinting inks on printing papers, and this additive failure is negligible on a photographic sensitive material in practice. Therefore, the trapping table in the memory 51 reduces the density $y_i$ of the Y component by multiplying the density $y_i$ by the density satisfaction ratio $R_y$, thereby simulating the additive failure on the printed image. Namely, output density $y_{out}$ of the Y component trapping table memory 51 is expressed as follows:

$$y_{out} = y_i \times R_y \qquad (2)$$

Referring to FIG. 4A, output signals $Y_2$ and $K_1$ from the first processing unit 40 correspond to the aforementioned monochromatic density values $y_i$ and $k_{jk}$ respectively, while the output signal $Y_3$ of the Y component trapping table memory 51 corresponds to the output density $y_{out}$. This trapping table memory 51 is formed as a two-dimensional look-up table memory which outputs a density signal $Y_3$ with addresses of the density signals $Y_2$ and $K_1$. Data in the two-dimensional look-up table memory are obtained on the basis of actual measurement described in relation to FIGS. 5A-5C, while the value of the density signal $Y_3$ is calculated by performing linear interpolation in the trapping table 51 when density values other than actually measured ones are inputted as the density signals $Y_2$ and $K_1$.

Also as to the M and C components, output density values $m_{out}$ and $c_{out}$ of the trapping table memories 52 and 53 are expressed as follows, similarly to the equation (2):

$$m_{out} = m_i \times \{(m_i{}^*k_{jm})/(m_i+k_{jm})\} = m_i \times R_m \qquad (3)$$

$$c_{out} = c_i \times \{(c_i{}^*k_{jc})/(c_i+k_{jc})\} = c_i \times R_c \qquad (4)$$

where $k_{jm}$ and $k_{jc}$ represent M component density and C component density in a region having a halftone area rate of j% on the sample $P_k$ respectively.

As to the K component, the K component trapping unit 54 is operable to compare with each other the monochromatic density values $y_i$, $m_i$ and $c_i$ of the Y, M and C components in gray density (corresponding to well-known equivalent neutral density) to extract the maximum value $X_{ik}$ thereof and to calculate an output density $k_{out}$ according to the following equation (5):

$$k_{out} = k_j \times \{(X_{ik}{}^*k_j)/(X_{ik}+k_j)\} = k_j \times R_{MAX} \qquad (5)$$

where $k_j$ represents gray density in a region having a halftone area rate of j% on the sample $P_k$. As understood from FIG. 6, the density reduction rate increases as the simply added density increases, in general. Therefore, the additive failure between chromatic color components other than the component providing the maximum gray density value $X_{ik}$ and the K component is excessively compensated for by the equation (5), and hence the color tone of the proof image may more or less differ from that of the printed matter. However, when the respective components of Y, M, C and K are corrected by the equations (2) to (5), mutual balance between sizes of halftone dots of the respective components in the proof image becomes substantially equal to mutual balance between sizes of the halftone dots on the printed image. In the case where such balances of sizes of the halftone dots are substantially equal to each other, moires and line interruption on the printed image can be advantageously reproduced on the proof image.

Figure 4B:
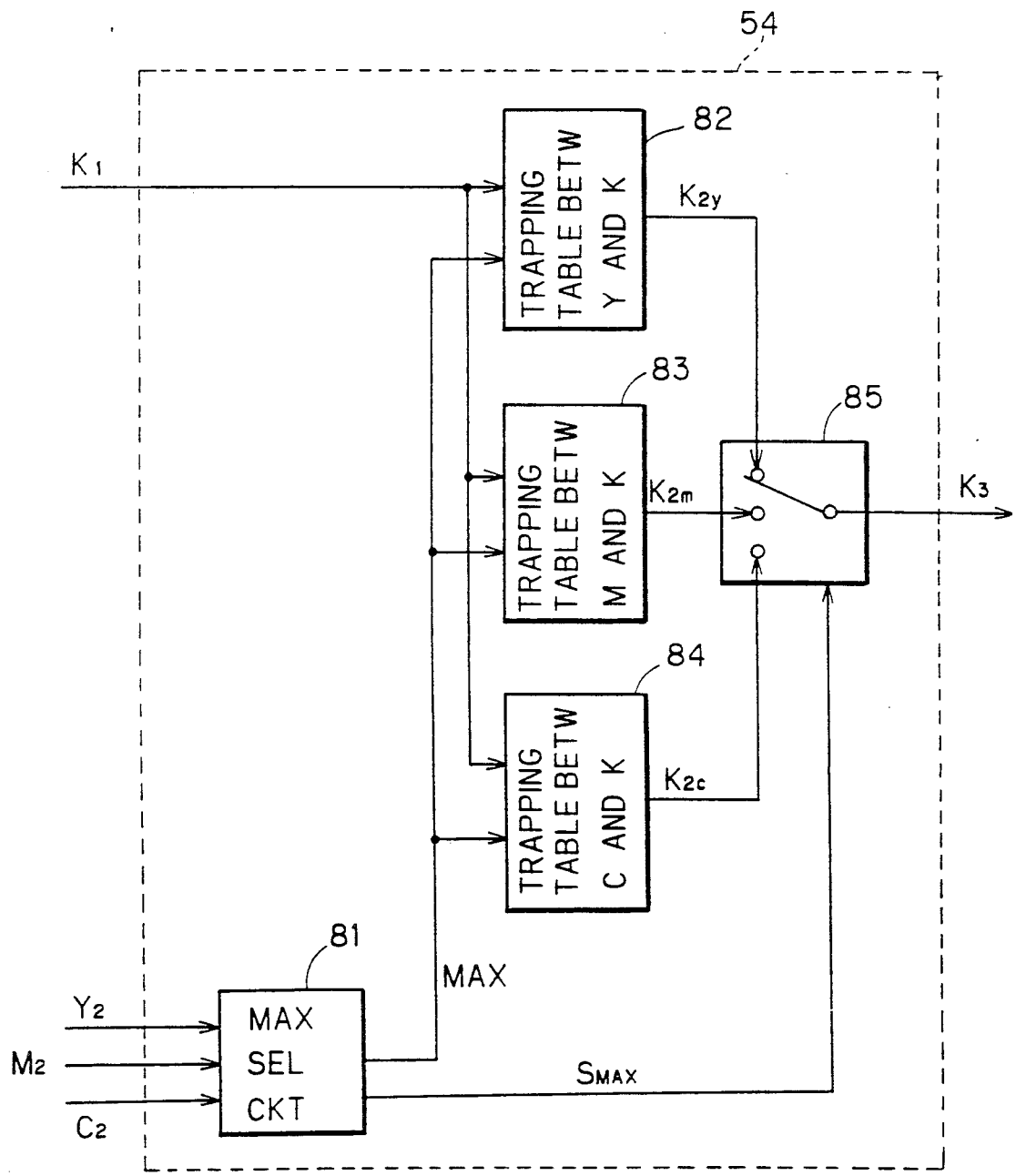

FIG. 4B is a block diagram showing the internal structure of the K component trapping unit 54 for obtaining the output density $k_{out}$ in accordance with the equation (5). Input signals $Y_2$, $M_2$, $C_2$ and $K_1$ correspond to the aforementioned monochromatic density values $Y_i$, $M_i$, $C_i$ and $K_j$, and an output signal $K_3$ corresponds to the output density $k_{out}$. The density signals $Y_2$, $M_2$ and $C_2$ respectively outputted from the color conversion table memories 41 to 43 in the first processing unit 40 are supplied to a MAX selection circuit 81 provided in the K component trapping unit 54. The MAX selection circuit 81 compares the signals $Y_2$, $M_2$ and $C_2$ with each other in gray density and supplies a signal MAX, which is one of the density signals $Y_2$, $M_2$ and $C_2$ having the maximum gray density value among the density signals $Y_2$, $M_2$ and $C_2$, to three trapping table memories 82 to 84. The density signal $K_1$ for the K component is also inputted in the three trapping table memories 82 to 84. The trapping table memories 82 to 84 are provided with conversion tables corresponding to the equation (5) and are operable to convert the signals $K_1$ and MAX into signals $K_{2y}$, $K_{2m}$ and $K_{2c}$ respectively. It is to be noted that the values of the density satisfaction rates for respective color components Y, M and C are not identical but are different from each other in general, and the value $(X_{ik}*k_j)$ in the equation (5) is not identical among respective color components Y, M and C. This is the reason why the table memories 82 to 84 are provided for respective color components Y, M and C.

The signals $K_{2y}$, $K_{2m}$ and $K_{2c}$ are supplied to a switch circuit 85. The switch circuit 85 selects one of the signals $K_{2y}$, $K_{2m}$ and $K_{2c}$ in response to a selection signal $S_{MAX}$ received from the MAX selection circuit 81, and outputs the same as a signal $K_3$, where the signal $S_{MAX}$ designates a color component Y, M or C providing the maximum gray density.

Referring to FIG. 4A. the density signals $Y_3$, $M_3$, $C_3$ and $K_3$ outputted from the second processing unit 50 are supplied to converters 61-64 which are provided in the third processing unit 60 and in which second conversion functions $F_{2y}$, $F_{2m}$, $F_{2c}$ and $F_{2k}$ are previously set. The second conversion functions $F_{2y}$, $F_{2m}$, $F_{2c}$ and $F_{2k}$ are functions for correcting gradations of the respective components Y, M, C and K, and are adapted to adjust gray balance. Namely, they correct difference between coloring properties of respective color layers of the color photosensitive material by the second conversion functions, thereby making adjustment so that the proof image on the color photosensitive material becomes a gray image having no color fogging when the image signals $S_Y$, $S_M$, $S_C$ and $S_K$ expressing a gray image are supplied to the proof image recorder 200. It is also possible to adjust the gradation of the calibration image by changing the second conversion functions $F_{2y}$, $F_{2m}$, $F_{2c}$ and $F_{2k}$.

Output signals $Y_4$, $M_4$, $C_4$ and $K_4$ of the third processing unit 60 express density values of the respective components Y, M, C and K. The fourth processing unit 70 converts these density signals $Y_4$, $M_4$, $C_4$ and $K_4$ into signals $S_{Y1}$, $S_{M1}$, $S_{C1}$ and $S_{K1}$ expressing gradation levels. Third conversion functions $F_{3y}$, $F_{3m}$, $F_{3c}$ and $F_{3k}$ provided in converters 71-74 are inverse functions of the first conversion functions $F_{1y}$, $F_{1m}$, $F_{1c}$ and $F_{1k}$, and are adapted to convert density values into halftone area rates and further convert the same into gradation levels. Gradation level signals $S_{Y1}$, $S_{M1}$, $S_{C1}$ and $S_{K1}$ outputted from the fourth processing unit 70 are inputted in the dot generators 203 as shown in FIG. 1B, so that the proof image is produced in accordance with the aforementioned procedure.

Figure 7:
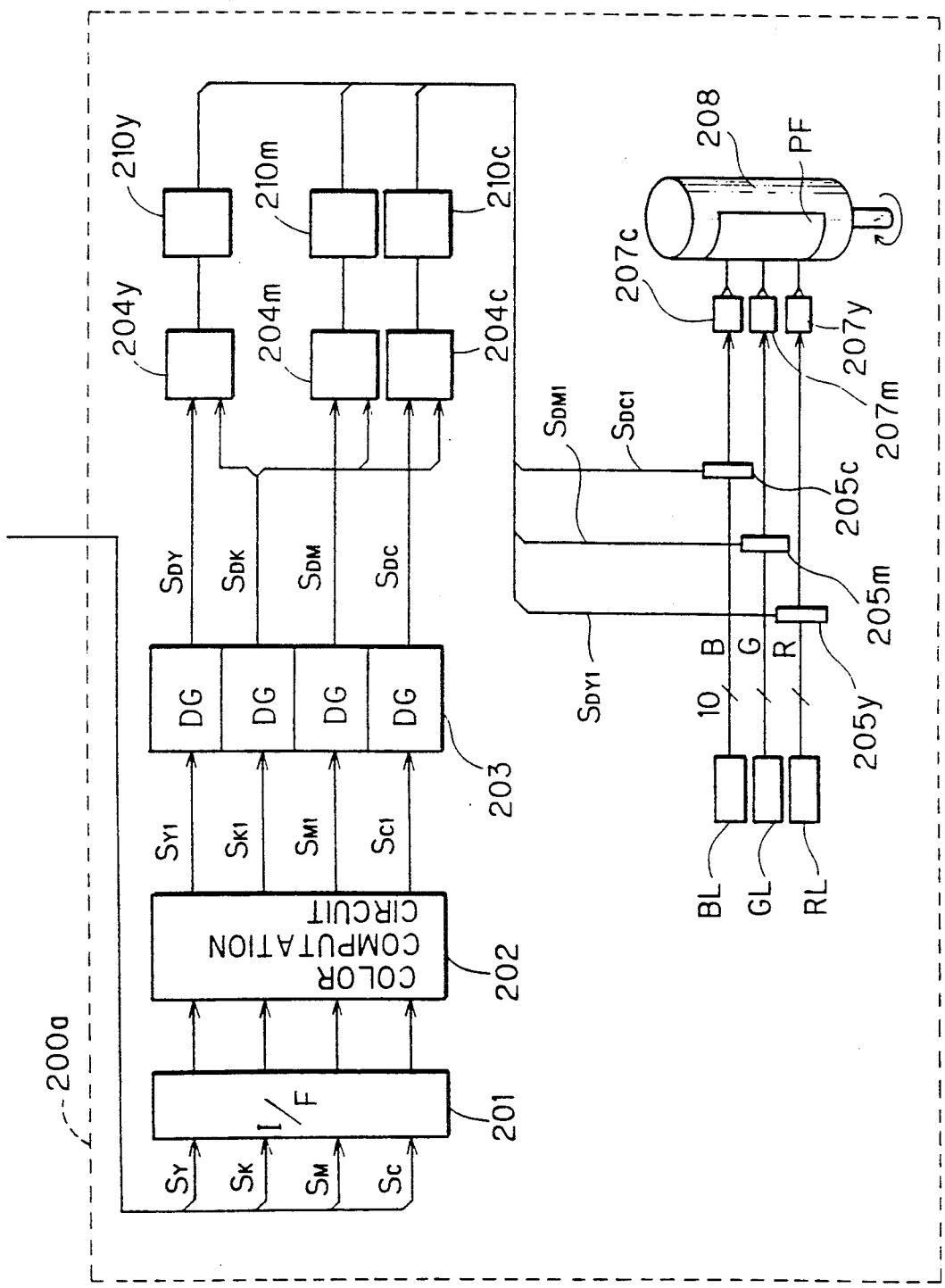

D. Modifications (1) The proof image recorder 200 shown in FIG. 1B combines the respective color light beams of the three colors R, G and B into ten beams in total to expose the color photosensitive film PF. Alternatively, a method of performing exposure without combining the respective color light beams R, 6 and B may be employed. FIG. 7 shows the structure of a proof image recorder 200a for exposing a color photosensitive film PF without combining the respective color light beams of the light components R, G and B but employing respective exposure lenses $207_c$, $207_m$ and $207_y$. Also in this case, each light of R, G and B is formed by ten beams. Since the light components R, G and B are converged by the respective exposure lenses independently, positions of scanning lines for the three colors are different form each other. In order to adjust such difference of the scanning line positions, delay circuits $210_y$, $210_m$ and $210_c$ are interposed between signal combining circuits $204_y$, $204_m$ and $204_c$ and AOM units $205_y$, $205_m$ and $205_c$ respectively. In general, a color proof image can be obtained on the color film PF with at least one composite light beam in which R, G and B color beams are spatially unified.

Figure 8A:
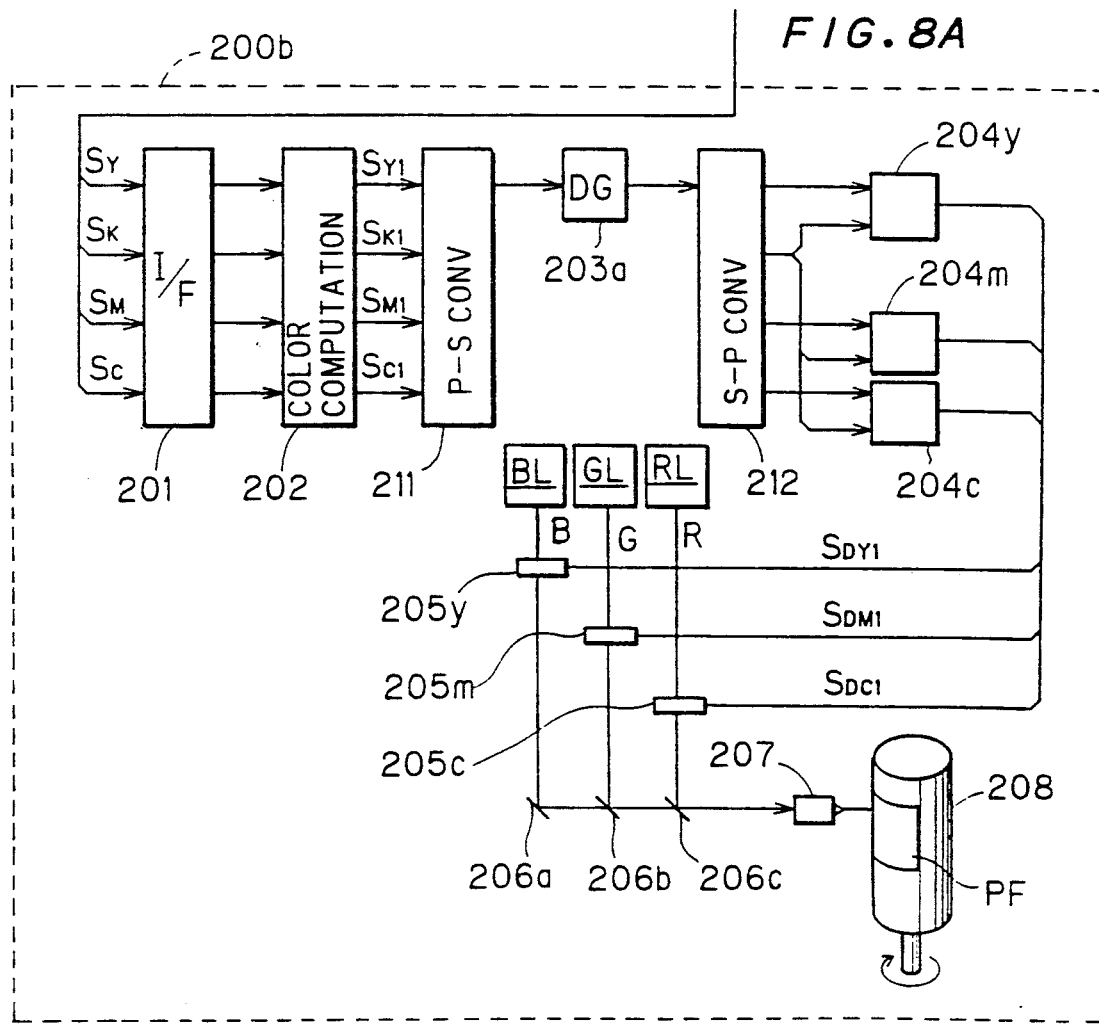
FIGS. 7, 8A and 8B are illustrative of modifications of the present invention.
Figure 8B:
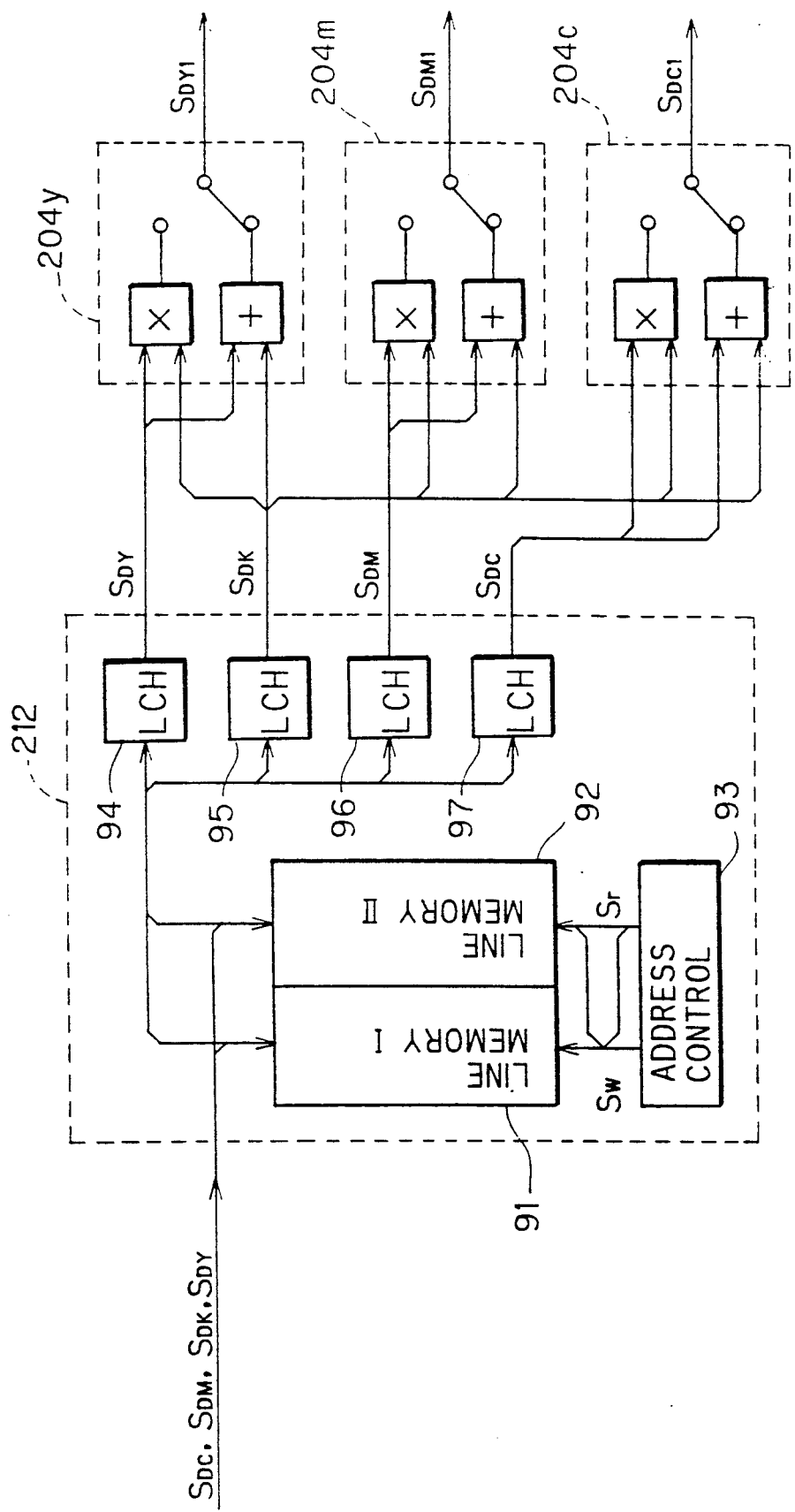

(2) The proof image recorder 200 shown in FIG. 1B processes the gradation level signals $S_{Y1}$, $S_{K1}$, $S_{M1}$ and $S_{C1}$ of the respective components in parallel by the four-channel dot generators, thereby converting the same into the halftone dot signals $S_{DY}$, $S_{DK}$, $S_{DM}$ and $S_{DC}$. Alternatively, gradation level signals of respective color components may be serially converted into halftone dot signals by one dot generator, as shown in FIG. 8A. In a proof image recorder 200b sown in FIG. 8A, the 4-channel dot generator 203 of the apparatus 200 shown in FIG. 1B is replaced by a parallel-to-serial converter 211, a 1-channel dot generator 203, and a serial-to-parallel converter 212. FIG. 8B is a block diagram showing the internal structure of the serial-to-parallel converter 212 and signal combining circuits $204_y$, $204_m$ and $204_c$. Halftone dot signals $S_{DY}$, $S_{DK}$, $S_{DM}$ and $S_{DC}$ serially transmitted from the dot generator 203a are alternately written in and read from two line memories 91 and 92 provided in the serial-to-parallel converter 212 every ten exposure beams. An address control circuit 93 controls such writing and reading. The halftone dot signals $S_{DY}$, $S_{DK}$, $S_{DM}$ and $S_{DC}$ for ten exposure beams read from the line memory 91 or 92 are held by latches 94 to 97 respectively, and thereafter outputted in a parallel manner from the serial-to-parallel converter 212 at the same timing. In FIG. 8B, the internal structure of the signal combining circuits $204_y$, $204_m$ and $204_c$ schematically draws the internal structure shown in FIG. 1B. The parallel-to-serial converter 211 performs operation reverse to that of the serial-to parallel converter 212.

(3) Although the K component trapping unit 54 provided in the color computation circuit 202 corrects the density $k_j$ of the K component in accordance with the equation (5), the density $k_j$ of the K component may be corrected by another method.

For example, in place of the maximum gray density value $X_{ik}$ in the equation (5), another representative numerical value such as an average value, the minimum value, an intermediate value (value which is neither the minimum value nor the maximum value) of the gray density components of the density values $y_i$, $m_i$ and $c_i$ for the chromatic color components, or the like may be employed. If the average value is used, same degrees of compensation for additive failure are attained in the respective chromatic color components.

(4) The second additive failure between the respective chromatic color components and the K component may be compensated for by the following equations (6) to (8), in place of the equations (2) to (4):

$$y_{out}=y_i-\Delta y_i k_{jy} \qquad (6)$$

$$m_{out}=m_i-\Delta m_i k_{jm} \qquad (7)$$

$$c_{out}=c_i-\Delta c_i k_{jc} \qquad (8)$$

where $\Delta y_i k_{jy}$, $\Delta m_i k_{jm}$ and $\Delta c_i k_{jc}$ represent the decreases in density due to the second additive failure, which are provided as follows:

$$\Delta y_i k_j=(y_i+k_{jy})-y_i*k_{jy} \qquad (9)$$

$$\Delta m_i k_j=(m_i+k_{jm})-m_i*k_{jm} \qquad (10)$$

$$\Delta c_i k_j=(c_i+k_{jc})-c_i*k_{jc} \qquad (11)$$

In the equations (6) to (8), the density reduced by the second additive failure between the respective chromatic color components and the K component are entirely compensated for by correction of the density values $y_i$, $m_i$ and $c_i$ of the respective chromatic color components. Therefore, if the contents of the trapping tables in the memories 51 to 53 shown in FIG. 4A correspond to the equations (6) to (8), the K component trapping unit 54 is unnecessary and the second processing unit 50 may directly output the density signal $K_1$ for the K printer as the signal $K_3$. If the signals of the respective components are corrected in accordance with the equations (6) to (8), the second additive failure of the respective chromatic color components can be correctly simulated or compensated for, and hence the color tone of the printed image can advantageously coincide with that of the proof image. In this case, however, attention must be drawn to the point that mutual balance between the sizes of the halftone dots of the respective printers of Y, M and C in the proof image and the sizes of the halftone dots of the K printer is more or less different from the balance on the printed image, dissimilarly to the case of using the equations (2) to (5).

In other words, it is preferable to use the equations (2) to (5) in order to confirm moires and line interruption of the printed image by the proof image, while it is preferable to use the equations (6) to (8) in order to confirm the color tone of the printed image. Of course it is convenient to produce both of a proof image using the equations (2) to (5) and a proof image using the equations (6) to (8), for confirming all of the color tone, moires and line interruption of the printed image.

E. Conclusion

As hereinabove described, according to the present invention, employed are first to third composite halftone dot signals expressing the logical sum of the halftone image of the black printer and the halftone images of the respective printers of yellow, magenta and cyan in positive logic or negative logic, whereby not only the halftone dots for the yellow, magenta and cyan printers but also the halftone dots for the black printer are reproduced in a color image which is recorded on a color photosensitive material on the basis of the first to third composite halftone dot signals. Thus, the present invention has such an advantage that a color image formed by halftone dots for respective printers of Y, M, and K can be directly produced on the basis of image signals of color separated images.

Further, the present invention also has such an advantage that the color tone of a color image recorded on a photosensitive material can substantially coincide with that of a printed image by performing prescribed color computation on the first to fourth image signals.

Although the present invention has been described and illustrated in detail, it is clearly understood that the same is by way of illustration and example only and is not to be taken by way o& limitation. The spirit and scope of the present invention should be limited only by the terms of the appended claims.

We claim:

1. A method of recording a color image on a color photosensitive material, comprising the steps of:
   (a) obtaining first to fourth image signals which respectively represent density levels of yellow, magenta, cyan and black components of a color original image for each pixel;
   (b) converting said first to fourth image signals into first to fourth halftone dot signals, respectively;
   (c) obtaining first to third composite halftone dot signals by:
      (c-1) combining said first halftone dot signal with said fourth halftone dot signal through a first logical operation to obtain said first composite halftone dot signal;
      (c-2) combining said second halftone dot signal with said fourth halftone dot signal through a second logical operation to obtain said second composite halftone dot signal; and
      (c-3) combining said third halftone dot signal with said fourth halftone dot signal through a third logical operation to obtain said third composite halftone dot signal; and
   (d) modulating exposure beams with said first to third composite halftone dot signals while scanning a color photosensitive material with said exposure beams, to thereby obtain a color image on said color photosensitive material.

2. The method of claim 1, wherein the step (b) comprises the steps of:
   (b-1) correcting said first to fourth image signals according to predetermined correction rules to obtain first to fourth corrected image signals, respectively; and
   (b-2) converting said first to fourth corrected image signal into said first to fourth halftone dot signals, respectively;
   and wherein said correction rules are so determined that a difference between respective color densities on printed images on printing medium and recorded images on color photosensitive medium can be compensated for.

3. The method of claim 2, wherein the step (b-1) comprises the step of:
   (b-1-1) correcting said first to third image signals for compensating for a difference between said respective color densities due to mixture of chromatic color components.

4. The method of claim 3, wherein the step (b-1) further comprises the step of:
   (b-1-2) after correcting said first to third image signals by the step (b-1-1), further correcting said first to third image signals for compensating for a difference between said respective color densities due to mixture of chromatic color components and an achromatic color component.

5. The method of claim 4 wherein the step (b-1-2) comprises the step of:
   correcting said first to third image signals by the following equations (Eq. 1) to (Eq. 3):

$$Y_{out} = y \times R_y \quad \text{(Eq. 1)}$$

$$m_{out} = m \times R_m \quad \text{(Eq. 2)}$$

$$c_{out} = c \times R_c \quad \text{(Eq. 3)}$$

where y, m and c are said first to third image signals after corrected by the step (b-1-1), respectively;

$R_y$, $R_m$ and $R_c$ are such quantities that $(1-R_y)$, $(1-R_m)$ and $(1-R_c)$ are ratios of gray density reduction in yellow magenta, and cyan due to mixture of chromatic color components and an achromatic color component on printed images, respectively; and $y_{out}$, $m_{out}$ and $c_{out}$ are result of corrections by said equations (Eq. 1) to (Eq. 3) for yellow, magenta and cyan, respectively.

6. The method of claim 4, wherein the step (b-1-2) comprises the step of:

correcting said first to third image signals by the following equations (Eq. 4) to (Eq. 6):

$$Y_{out} = y - \Delta yk \quad (Eq.\ 4)$$

$$m_{out} = m - \Delta mk \quad (Eq.\ 5)$$

$$c_{out} = c - \Delta ck \quad (Eq.\ 6)$$

where y, m and c are said first to third image signals after corrected by the step (b-1-1), respectively:

$\Delta yk$, $\Delta mk$ and $\Delta ck$ are decreases of color densities in yellow, magenta and cyan due to mixture of chromatic color components and an achromatic color component on printed images, respectively; and $y_{out}$, $m_{out}$ and $c_{out}$ are result of corrections by said equations (Eq. 4) to (Eq. 6) for yellow, magenta and cyan, respectively.

7. The method of claim 5, wherein the step (b-1) further comprises the steps of:

(b-1-3) after correcting said first to third image signals by the steps (b-1-1) and (b-1-2), comparing said first to third image signals with each other in gray density to obtain a reference signal representative of one of said first to third image signals, and (b-1-4) generating said fourth corrected image signal as a function of said reference signal and said fourth image signal.

8. The method of claim 7, wherein the step (b-1-3) comprises the step of:

specifying one of said first to third image signals having a maximum signal level in gray density among said first to third image signals after corrected by said steps (b-1-1) and (b-1-2), to thereby obtain said reference signal.

9. The method of claim 7, wherein the step (b-1-3) comprises the step of:

specifying one of said first to third image signals having a minimum signal level in gray density among said first to third image signals after corrected by said steps (b-1-1) and (b-1-2), to thereby obtain said reference signal.

10. The method of claim 7, wherein the step (b-1-3) comprises the step of:

selecting one of said first to third image signals having an intermediate signal level in gray density among said first to third image signals after corrected by said steps (b-1-1) and (b-1-2), to thereby obtain said reference signal.

11. The method of claim 7, wherein the step (b-1-4) comprises the step of:

generating said fourth corrected image signal by the following equation (Eq. 7):

$$k_{out} = k \times R\ tm\ (Eq.\ 7)$$

where k is said fourth image signal;

$k_{out}$ is said fourth corrected image signal; and

R is such quantity that (1-R) is a ratio of gray density reduction due to mixture of an achromatic color component and a chromatic color component represented by said reference signal.

12. The method of claim 1, wherein said color photosensitive material is a negative color photosensitive material; and said first to third logical operations are operations to take respective logical sums of:

said first and fourth halftone dot signals;

said second and fourth halftone dot signals; and said third and fourth halftone dot signals; respectively.

13. The method of claim 1, wherein said color photosensitive material is a positive color photosensitive material; and said first to third logical operations are operations to take respective logical products of:

said first and fourth halftone dot signals;

said second and fourth halftone dot signals; and said third and fourth halftone dot signals; respectively.

14. An apparatus for recording a color image on a color photosensitive material, comprising:

(a) means for inputting first to fourth image signals which respectively represent density levels of yellow, magenta, cyan and black components of a color original image for each pixel;

(b) means for converting said first to fourth image signals into first to fourth halftone dot signals, respectively;

(c) means for obtaining first to third composite halftone dot signals, comprising:

(c-1) means for combining said first halftone dot signal with said fourth halftone dot signal through a first logical operation to obtain said first composite halftone dot signal;

(c-2) means for combining said second halftone dot signal with said fourth halftone dot signal through a second logical operation to obtain said second composite halftone dot signal; and (c-3) means for combining said third halftone dot signal with said fourth halftone dot signal through a third logical operation to obtain said third composite halftone dot signal; and (d) means for modulating exposure beams with said first to third composite halftone dot signals while scanning a color photosensitive material with said exposure beams, to thereby obtain a color image on said color photosensitive material.

15. The apparatus of claim 14, wherein said means (b) comprises:

(b-1) means for correcting said first to fourth image signals according to predetermined correction rules to obtain first to fourth corrected image signals, respectively; and (b-2) means for converting said first to fourth corrected image signal into said first to fourth halftone dot signals, respectively;

and wherein said correction rules are so determined that a difference between respective color densities on printed images on printing medium and recorded images on color photosensitive medium can be compensated for.

16. The apparatus of claim 15, wherein said means (b-1) comprises:

(b-1-1) means for correcting said first and third image signals for compensating for a difference between said respective color densities due to mixture of chromatic color components.

17. The apparatus of claim 16, wherein
said means (b-1) further comprises:
 (b-1-2) means for correcting said first to third image signals for compensating for a difference between said respective color densities due to mixture of chromatic color components and an achromatic color component.

18. The apparatus of claim 17, wherein
said means (b-1) further comprises:
 (b-1-3) means for comparing said first to third image signals with each other in gray density after corrected by said means (b-1-1) and (b-1-2) to obtain a reference signal representative of one of said first to third image signals, and
 (b-1-4) means for generating said fourth corrected image signal as a function of said reference signal and said fourth image signal.

19. The apparatus of claim 14, wherein
said means (c-1) comprises:
(c-1-1) first AND gate means and first OR gate means for obtaining a first logical product and a first logical sum of said first and fourth halftone dot signals, respectively;
said means (c-2) comprises:
(c-2-1) second AND gate means and second OR gate means for obtaining a second logical product and a second logical sum of said second and fourth halftone dot signals, respectively;
said means (c-3) comprises:
(c-3-1) third AND gate means and third OR gate means for obtaining a third logical product and a third logical sum of said third and fourth halftone dot signals, respectively; and
said means (c) further comprises:
(c-4) means for selecting said first to third logical products or said first to third logical sums in response to a switching signal inputted, to thereby generate said first to third composite halftone dot signals.

20. The apparatus of claim 15, wherein said means for converting said first to fourth corrected image signals comprises a plurality of dot generators receiving corrected image signals and outputting respective halftone dot signals.

* * * * *